US009661272B1

(12) United States Patent
Daniel (10) Patent No.: US 9,661,272 B1
(45) Date of Patent: May 23, 2017

(54) APPARATUS, SYSTEM AND METHOD FOR HOLOGRAPHIC VIDEO CONFERENCING

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 15/009,735

(22) Filed: Jan. 28, 2016

Related U.S. Application Data

(60) Provisional application No. 62/108,617, filed on Jan. 28, 2015.

(51) Int. Cl.
| | |
|---|---|
| *H04N 7/14* | (2006.01) |
| *H04N 7/15* | (2006.01) |
| *G03H 1/00* | (2006.01) |
| *G03H 1/04* | (2006.01) |
| *G06K 9/00* | (2006.01) |

(52) U.S. Cl.
CPC ............ *H04N 7/15* (2013.01); *G03H 1/0005* (2013.01); *G03H 1/0443* (2013.01); *G06K 9/00885* (2013.01); *G03H 2001/0088* (2013.01)

(58) Field of Classification Search
CPC ....................................................... H04N 7/14
USPC ..................... 348/14.01, 14.07, 14.04, 14.03
See application file for complete search history.

(56) References Cited

U.S. PATENT DOCUMENTS

2012/0314021 A1* 12/2012 Tsang ..................... G03H 1/02
348/40
2016/0253068 A1* 9/2016 Fein .................... G02B 27/0093

* cited by examiner

*Primary Examiner* — Olisa Anwah
(74) *Attorney, Agent, or Firm* — Alberto Interian III, Esq.

(57) ABSTRACT

This specification relates to an apparatus, system and method of projecting holographic images for a video conference, wherein a user may use the apparatus for telecommunication transmissions. The apparatus also includes biometric verification means for verifying the identity of the user using his/her biometric authentication credentials. Upon verification of the user's biometric sample, a keypad door is opened to reveal a concealed keypad and a camera door is also opened to reveal and release a telescopic camera in the retracted position, enabled for capturing an image (video including picture and audio) of teleconferencing attendees that are within the apparatus' field of view, where the captured image may be transmitted to a receiving holographic video conferencing apparatus, where the captured video image is projected as a hologram, with audio output provided via the speaker/microphone system.

30 Claims, 8 Drawing Sheets

APPARATUS, SYSTEM AND METHOD FOR HOLOGRAPHIC VIDEO CONFERENCING

PRIORITY CLAIM

This patent application is a Non-Provisional patent application and claims priority under 35 U.S.C. §119(e) to U.S. Provisional Patent Application Ser. No. 62/108,617, titled "Apparatus, System and Method of Holographic Video Conferencing" filed Jan. 28, 2015. The entire disclosure of the afore-mentioned patent application is incorporated by reference as if fully stated herein.

FIELD OF THE INVENTION

This specification relates to an apparatus, system and method of projecting holographic images for a video conference, wherein a user may use the apparatus for telecommunication transmissions. The apparatus also includes biometric verification means for verifying the identity of the user using his/her biometric authentication credentials. Upon verification of the user's biometric sample, a keypad door is opened to reveal a concealed keypad and a camera door is also opened to reveal and release a telescopic camera in the retracted position, enabled for capturing an image (video including picture and audio) of teleconferencing attendees that are within the apparatus' field of view, where the captured image may be transmitted to a receiving holographic video conferencing apparatus, where the captured video image is projected as a hologram, with audio output provided via the speaker/microphone system.

BACKGROUND OF THE INVENTION

This invention relates to an apparatus, system and method for allowing users to use a hologram generator conference apparatus to transmit and/or receive telecommunications for electronic transmissions for video conferencing using a camera to capture images within the apparatus' field of view that are transmitted and displayed by a second receiving apparatus, where the video image that is being transmitted is received and displayed as a hologram.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the apparatus, system and method(s) as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

FIGS. 1A-1D show the hologram generator conferencing apparatus 100 according to aspects of embodiments of the present invention. Apparatus 100 comprises at least one projector 102 disposed within the apparatus 100, enabled for projecting a hologram and/or holographic images 104; a camera 106 enabled for capturing at least one image (video including picture and data collectively referred to as "image") 108; a biometric verification device 110, disposed within the apparatus 100, enabled for validating a biometric sample, and upon validation of the biometric sample of an authorized user performing the following: activating a first release and retract mechanism 112 disposed within the apparatus 100 and in communication with the biometric verification device 110, enabled for retracting a keypad door 114 within the apparatus' housing 116, wherein the keypad door 114 is configured for concealing or revealing a keypad 118; activating a second release and retract mechanism 120 disposed within the apparatus 100 and in communication with the biometric verification device 110, enabled for retracting a camera door 122 within the apparatus' housing 116 releasing the at least one projector 102, and at least one telescopic camera 106, wherein the camera door 122 is configured for concealing or revealing at least one projector 102 and/or a camera 106 enabled for capturing at least one image 108; and automatically activating at least one or more camera sensors 124, 124', 124", 124" enabled for projecting the hologram video image 104; and a computer processor 126 disposed within the apparatus 100, wherein the processor 126 is in communication with the projector 102, the camera 106, biometric verification device 110, the first mechanism 112, the second mechanism 120, and memory 128 all disposed within the apparatus 100 and wherein the processor 126 is configured to process the at least one captured image 108 and/or the hologram and/or holographic video images 104. Apparatus 100 also comprises an integrated speaker and microphone system 130 (collectively referred to herein as "speaker") of the like, kind and configuration comprising of software and hardware for providing auditory output for a conference call as those generally used in the arts for teleconferencing devices, where the audio data is captured via the microphone and the video conference hologram is published over the speakers.

The at least one or more projector(s) 102 are disposed within the apparatus 100, where the projector(s) 100 may be configured to project hologram(s) and/or holographic video image(s) inclusive of picture and audio. Projector(s) 102 may, in one aspect of an embodiment of the present invention, also be configured to function as a camera 106 and/or camera optical relay. Hologram generator conferencing apparatus 100 may also be configured to project the hologram(s) on a display 134' screen that is constructed of materials that are known and used in the art for electronic screen displays.

In one aspect of an embodiment of the present invention, hologram generator conferencing apparatus 100 may be enabled by 3-D holographic imaging technology thereby enabling projector(s) 102 to project a 3-D image in real time. Projector(s) 102 may, in another aspect of an embodiment of the present invention, include 3D depth sensors 124, which are enabled to project the holographic video images 108 and to detect hand interactivity with hologram(s) or holographic video image(s) 104. In one aspect of an embodiment of the present invention, hologram generator conferencing apparatus 100 may use depth-sensing technology to detect a user's hands in real-world space. Apparatus 100 may include an operating system 132 that may, in one aspect of an embodiment of the present invention, use gesture recognition software to process hand states and position. Interactive logic may also be applied to the processed data and the 3-D scene or image responds accordingly.

Projector(s) 102 may also, in another aspect, include visual trackers, which, in one aspect may include one or more lasers, which may be used to accurately track the hands of a user and the interaction with hologram(s) or holographic video image(s) 104. These aspects of projector(s) 102 enable a user to control hologram(s) or holographic video image(s) 104 and the content projected within hologram(s) or holographic video image(s) 104.

In one aspect of an embodiment of the present invention, the 3-D image projected by projector(s) 102 may be viewed by way of 3-D glasses. In another aspect, hologram generator conferencing apparatus 100 may be configured to feed real time content and may be compatible with secondary enabled devices, including, without limitation, a second hologram generator conferencing apparatus 100', mobile phones, active and/or passive 3-D glasses, etc. These enabled devices may be able to communicate with hologram generator conferencing apparatus 100 in a number of ways, including, without limitation, hardwire connection and/or wireless connection. For wider compatibility, hologram generator conferencing apparatus 100 may include USB/serial port(s) 142 and Wi-Fi radio to this end. Compatible enabled devices may also have standard communication protocol libraries. In another aspect of an embodiment of the present invention, hologram generator conferencing apparatus 100 may be controlled by way of one or more of the enabled devices.

Hologram(s) or holographic video image(s) 108 may be seen with smart mobile and optical devices, which have the capability to render 3-D objects in real-time over a live camera feed. Hologram generator conferencing apparatus 100 may, in yet another aspect of an embodiment of the present invention, be enabled to project content communicated through one or more enabled devices.

As shown, hologram generator conferencing apparatus' unitary housing 116 is configured for housing all the various component elements described herein and may, in one aspect of an embodiment of the present invention, be constructed of a lightweight, hard, durable material, e.g. a plastics commonly used for PVC piping, and more particularly, capable of resourcefully controlling one or more hologram images 104, video hosting or other multimedia data passing through operating system 132 and releasing (or displaying) the same in real-time when the user operated hologram generator conferencing apparatus 100 provides the commands for such display. Processor 126 may be configured to generate at least one or more holograms 104 corresponding to a desired image to be displayed. Holograms and/or holographic images 104 may be projected by way of one or more of projector(s) 102.

In aspects of embodiments of the present invention, hologram generator conferencing apparatus 100 may be enabled for the transformation of hologram(s) or holographic video image(s) 104 and/or the content of hologram(s) or holographic video image(s) 104 and the real time manifestation of hologram(s) or holographic video image(s) 104 in conjunction with projector(s) 102 and projector(s) 102's optical projection of hologram(s) or holographic video image(s) 104.

Hologram generator conferencing apparatus 100, in one aspect of an embodiment of the present invention, may provide for the hosting and display of already made hologram images or videos 104 and a second apparatus 100' for transferring or displaying the same, which may be displayed by any means such as a separate and discrete secondary display 134' device via the second apparatus' projector 102', but not exclusively for the above mentioned devices or platforms. In some embodiments, the hologram or holographic video image(s) 104 is projected as a 3-dimensional video image in the air without requiring a screen 126. In some embodiments, the projected hologram or holographic video image(s) 104 is projected through a cone to further direct the video image 104 display in the air.

Camera 106 disposed within the apparatus 100 may include any type of camera, an infrared camera, a thermal imaging camera, a video sensor, a digital camera, a 3D camera, and the like. Camera 106 may include a flash, which may be used to illuminate the subjects in the image. In preferred embodiments, the camera 106 may include a field of view that encompasses the same field of view as a secondary display device that may be connected to the apparatus 100. The telescopic camera 106 remains in the retracted position until verification by an authorized user, and upon verification, the camera door 122 retracts within the housing 116, the camera 106 is automatically released from the retracted position and extends telescopically outward to the camera ready position for capturing an image 108.

Biometric verification module 110 may include at least one processor 104 disposed in communication with, for example, a fingerprint scanner, hand geometry scanner, a palm geometry scanner, iris scanner, retina scanner, or a user interface, which may include an audio receiving circuit capable of receiving audio signals at predetermined frequencies and/or with additional hardware complete with electronic circuitry and such other biometric verification devices that are known and used in the arts. In the exemplary embodiment, biometric verification module 110 includes a fingerprint scanner, where the microprocessor 126 controls the functionality of the fingerprint scanner, generating the varied algorithms for storage of the first valid biometric sample as a biometric identifier and validates the images of subsequent biometric samples received from the apparatus 100. Each authorized user's biometric identifier is stored as a biometric algorithm that is encoded and used during the authentication process for access to the apparatus 100. In some embodiments, to prevent inadvertent access, the entire authentication process is timed such that the user has only a short window to provide an accurate biometric sample that matches the biometric identifier's algorithm stored on the apparatus 100.

In some embodiments, to start a holographic video conference (either receiving or making a teleconference call), user may submit, e.g. his/her biometric authentication credential, e.g. a fingerprint, which will be authenticated against a stored biometric identifier. Processor 126, upon receipt of the electronic data from the biometric sample as received from the biometric verification device 110, records the data and compares the received data with a previously stored biometric algorithm stored in memory 128. Upon authentication of the biometric sample as authenticated by the biometric verification module 102 with a successful or positive match between the received data and the previously stored user verification biometric algorithm for an authorized user, processor 126 issues a command to the first release and retract mechanism 112 for keypad door 114 to open; and to the second release and retract mechanism 120 for the camera door 116 to open, retracting both doors 114, 116 into the apparatus' housing 110.

The first release and retract mechanism 112 and the second release and retract mechanism 120 may include at least one or more circuits and mechanical devices, which are connected to the keypad door 114 and the camera door 122, respectively. Upon receipt of the command from the processor 126, circuits translate the command and open the circuits with power supplied by the electrical power supply to the apparatus 100, thereby enabling the mechanical device to be powered and operational. Once operational, the mechanical devices retract the keypad door 114 and the camera door 122 into the apparatus' housing 116, thereby revealing the concealed keypad 118 and the camera 106, respectively. In an aspect of an embodiment of the present invention, once apparatus 100 stops transmitting holograms or holographic video image(s) and/or the camera 106 stops capturing image(s) or is otherwise shut down by for example upon receipt of a command entered on the display of the display 134 (and/or the keypad 118), circuit reverses the circuit current flow thereby reversing the direction of motion of mechanical device which in turn closes keypad door 114, the camera is retracted from its extended position and closes the camera door 106. In an aspect of an embodiment of the present invention, mechanical device may be a linear mini-actuator or the like.

The keypad 112 may comprise of a virtual keypad with touch screen display or a keypad with programmable buttons 120, 120' that may be each labeled with an alphanumeric character, e.g. QWERTY alphanumeric keypad inclusive of numbers. The revealed keypad 118 (previously concealed) may be used to dial for example, a teleconference number that may be associated with a second apparatus 100', where the captured image 108 that was transmitted from the first apparatus 100 is received, converted into a hologram video image 104 and displayed as hologram(s) or holographic video image(s) 104 by the second apparatus 100'.

The camera door 122 may comprise of an unitary door or shutters with mini blades circumferentially arranged as are well known and used in the arts, so that when the camera door 122 is activated, the door or shutters reveal the retracted, telescopic 3D camera 106 activated for capturing an image 108 within the camera's field of view and the at least one or more 3D Depth camera sensors 124, 124' are activated for projecting the hologram video image 104. The captured image 116 is transmitted via a communication module 136 to a receiving second apparatus 100', where it is reflected as a holographic display 120 by the second apparatus' projector 102 on a secondary display 134' screen.

Communication module 136, disposed within the apparatus 100, is either electrically or mechanically connected to processor 126, which controls the operations of the communications module 132. Processor 126 that is also in electrical or mechanical communication with the camera 106, recognizes when an image 108 and audio is captured and issues a command to the communication module 136 to transmit the at least one captured image 108 to the second apparatus 100'. Each apparatus' communication module 136 is enabled for receiving the at least one captured image 108, for which its respective processor 126 converts the received captured at least one image 108 and issues a command to its projector 102 to display the converted image 108 as holographic video images 104.

In some embodiments, communication module 136 may be a wireless communication module 136, which employ short range wireless protocol, such as, but not limited to, a radio frequency transceiver, a radio frequency receiver, and/or a radio frequency transmitter. The communication module 136 may include any type of communications means, including, but not limited to, a wireless communications means or wired communications means, such as a GSM modem, a WiFi module, a Bluetooth module, a ZigBee module, and any other type of communications means used to communicate directly with another apparatus, or indirectly with another secondary device, such as a second apparatus 102', secondary display 134 device, other devices with video conferencing capabilities, e.g. cellular phone, personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

In yet another embodiment, communication module 136 comprises a communications means for accessing a cellular network, such as a GSM network, a data network, such as a local data network, or a wide area data network, such as the Internet. In yet another embodiment, at least one communication module 136 comprises a communications means for accessing a web-enabled device, such as a Bluetooth module for accessing a web-enabled smartphone or a second apparatus 100'. Communication module 136 is enabled for transmitting the captured video image (picture and voice data) over a computer network using for example an Ethernet coaxial cable acting as a broadcast transmission medium, which can be attached at the Ethernet port 140. The apparatus 100 may also be connected to other computing devices via a USB port 142.

Communication module 136 is operative to transmit or receive electronic communications (data), e.g. the captured image 108, via a short range wireless protocol, such as, but not limited to, a radio frequency receiver, a radio frequency transmitter, or a radio frequency transceiver. Communication module 136 is enabled for issuing notification of incoming calls with a ring signal to the apparatus 100, whereby upon receiving the call, similar to making the call, user is required to first authenticate his/her authority via the biometric verification module 110, e.g. provide fingerprint for authentication, to start the system. Communication module 136 is also enabled for providing notification via the apparatus' display 134 that is disposed within the apparatus 100 of incoming/outgoing calls; transmit data while the teleconference session is active; issue a busy signal to incoming calls while teleconference mode is operational, cease and/or pause transmission of the captured image when the teleconferencing session is terminated/inactive.

In some embodiments, the receiving second apparatus 100' is notified of an incoming transmission by a telephone ring through the speakers 130, which activates the keypad door 114 to open. However, the recipient of the incoming transmission will need to authenticate his/her biometric identifier using the biometric verification module 110 prior to the secondary apparatus 100' permitting the projector 102 to project the transmitted captured image as a hologram or holographic video images 104.

Hologram generator conferencing apparatus 100 may further include an operating system 132, which may further include a processor 126 and memory 128 and, in another aspect, additional modules or components as necessary. In one aspect of an embodiment of the present invention, processor 126 may, in one aspect of an embodiment of the present invention, be disposed in communication with memory 128. Processor 126 may be any type of processor, such as, but not limited to, a central processing unit (CPU), a microprocessor, a video processor, a front end processor, a coprocessor, a single-core central processor, a multi-core processor, or a combination thereof and the like.

In one aspect of an embodiment of the present invention, embedded within processor 126 are computer executable instructions or code 138, which are readable and executable by processor 126. In another aspect, these computer executable instructions 138 may be stored in memory 128. Computer executable instructions 138 may be in the form of a computer program, the program being composed in any suitable programming language or source code, such as C++, C, JAVA, JavaScript, HTML, XML, and other programming languages. Computer executable instructions 138 may be configured for performing any and all the necessary functions for hologram generator conferencing apparatus 100 and operations disclosed herein.

Memory 128 is either electrically or mechanically connected to the computer processor 126. In the case of electronic connections, the electronic connections may be wired and/or wireless connections. Memory 128 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory 128 may be used to store content, including but not limited to instruction module 204, operating system 156, at least one captured image 108, hologram video image(s) 104 and audio, user authentication information, and the like. Information stored thereon may be retrieved from memory 128 using the computer processor 126.

Apparatus 100 may include any kind of display 134 that may include a display of the keypad 118, wherein the display 134 includes, but is not limited to: a liquid crystal display ("LCD") screen, a light emitting diode ("LED") display, touchpad or touch screen display, and/or any other means known in the arts for emitting a visually perceptible output.

The display 134' screen, a separate device, for displaying the hologram video image(s) 108 likewise includes a LCD, LED display and/or any other means known in the arts for emitting a visually perceptible output. Apparatus' processor 126 is in electronic communication with its display 134. In other embodiments, display 134 is wirelessly connected to processor 126. Display 134 may include a control means, such as, but not limited to, a touch screen, keypad, virtual keys, a stylus, and other input devices and the like. In some embodiments, display may be electronically connected to the apparatus 100 according to the hardware and software protocols that are well known and used in the arts. Processor 126 controls the first release and retract mechanism 112 that retracts the keypad doors 116 to reveal the apparatus' display 134.

Systems

Figure 1A:
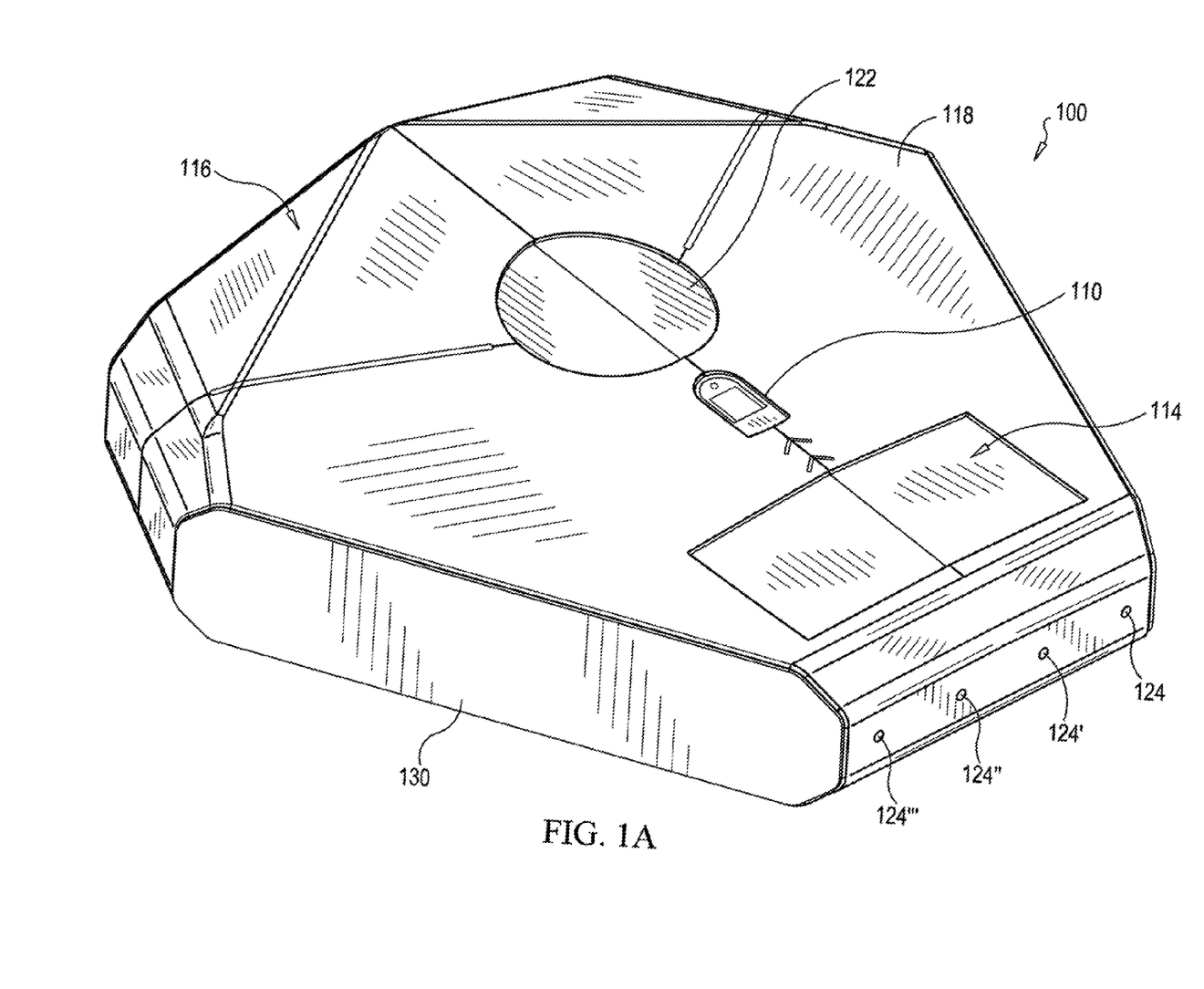
FIGS. 1A-1D show perspective views of the hologram generator device according to aspects of embodiments of the present invention.
Figure 1B:
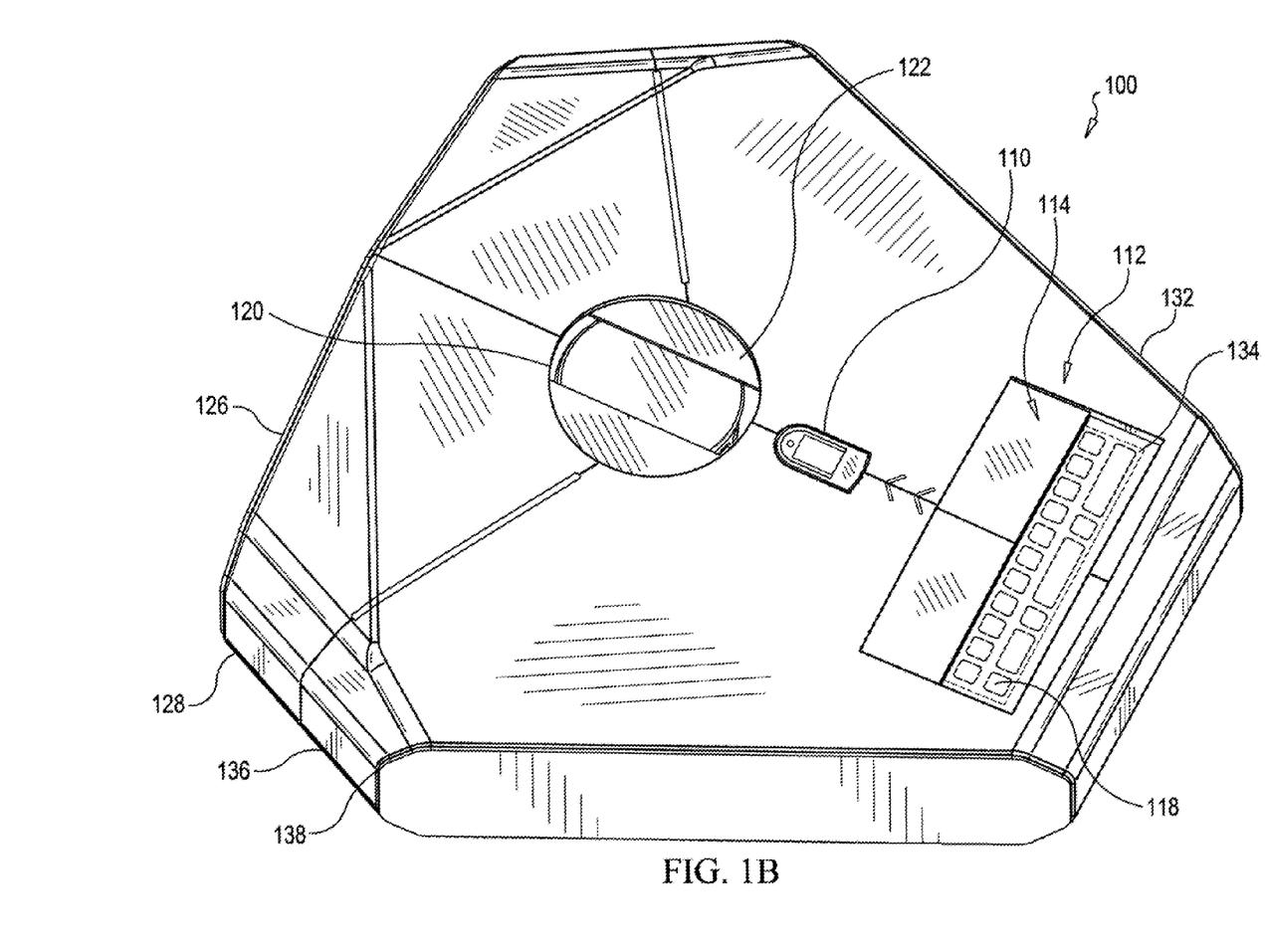
Figure 1C:
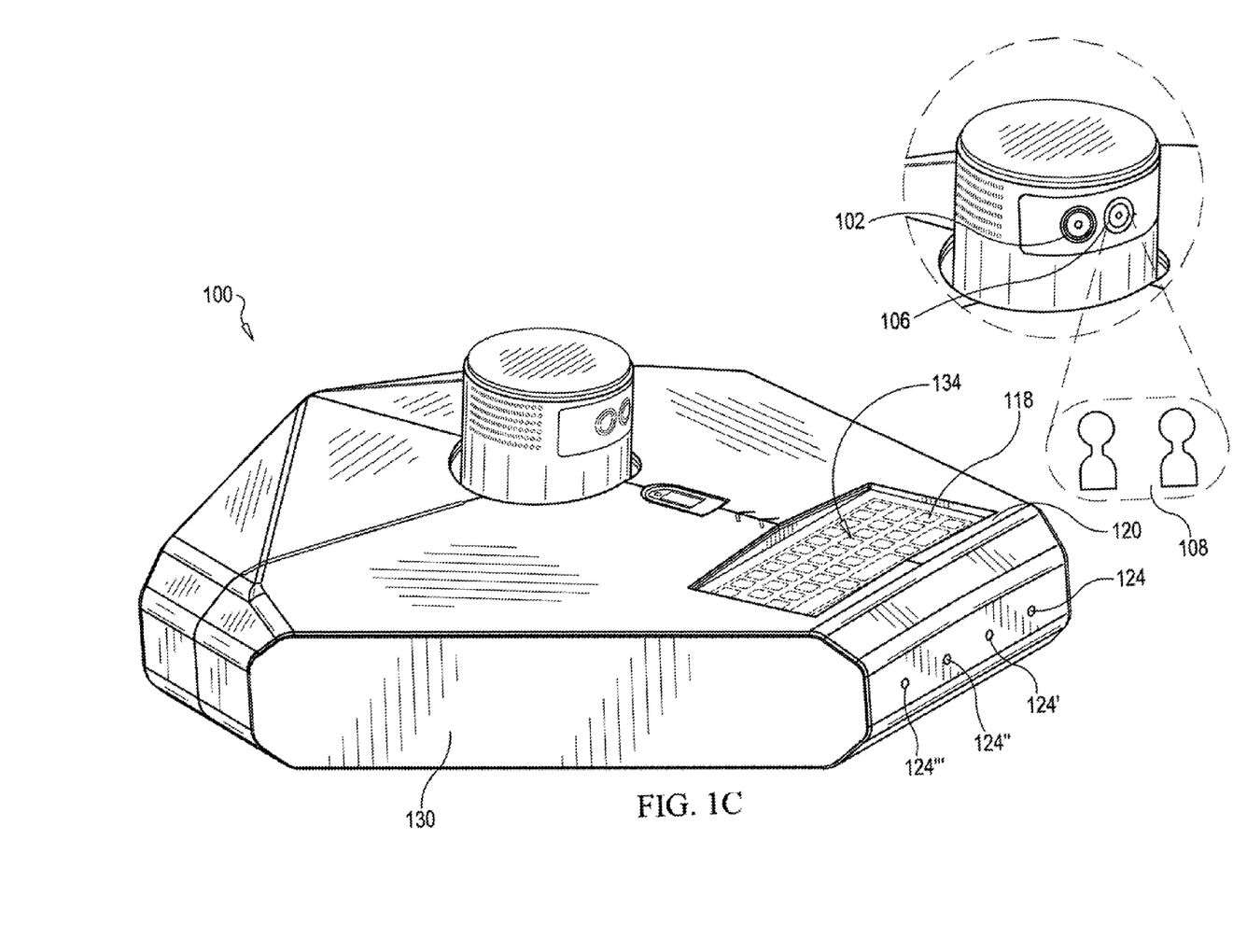
Figure 1D:
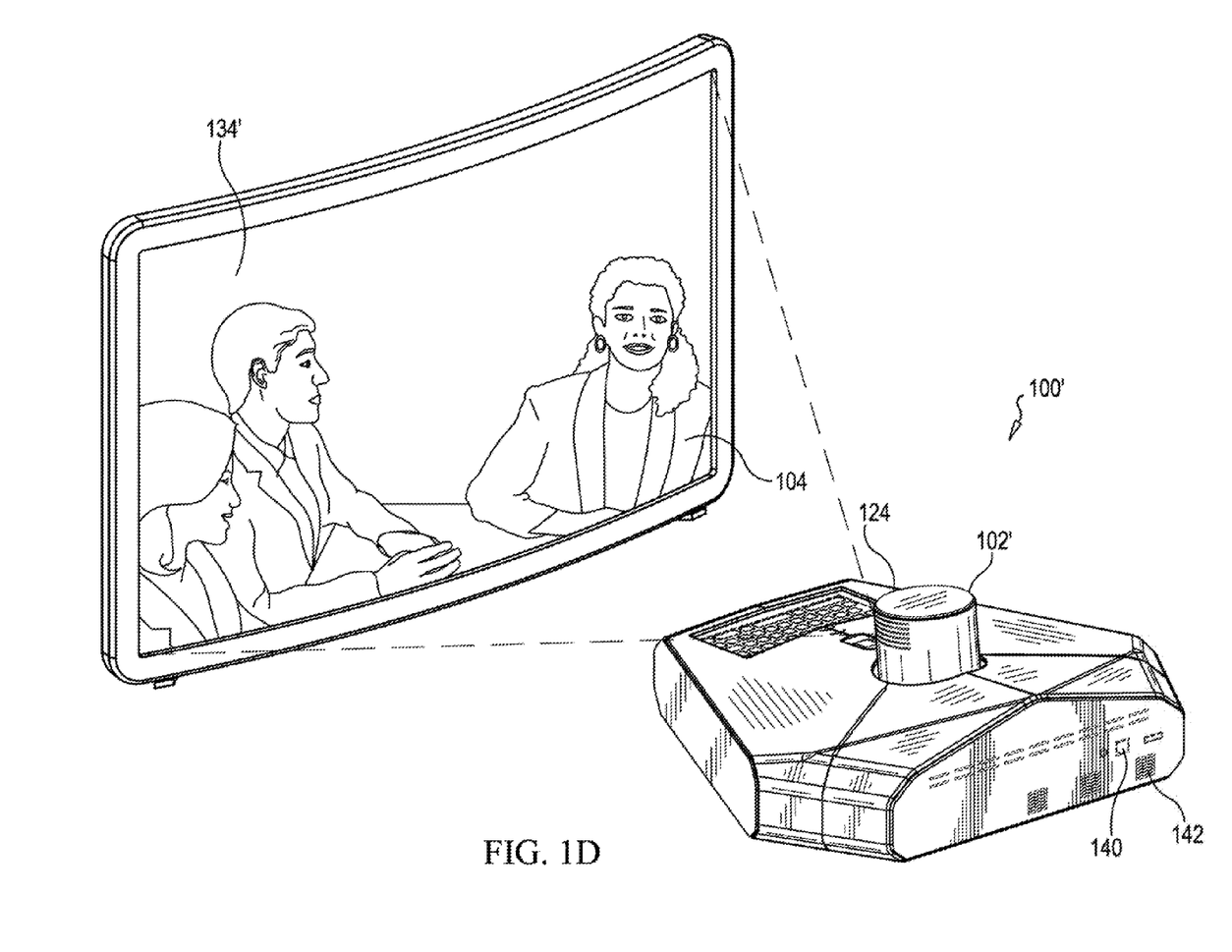
Figure 2A:
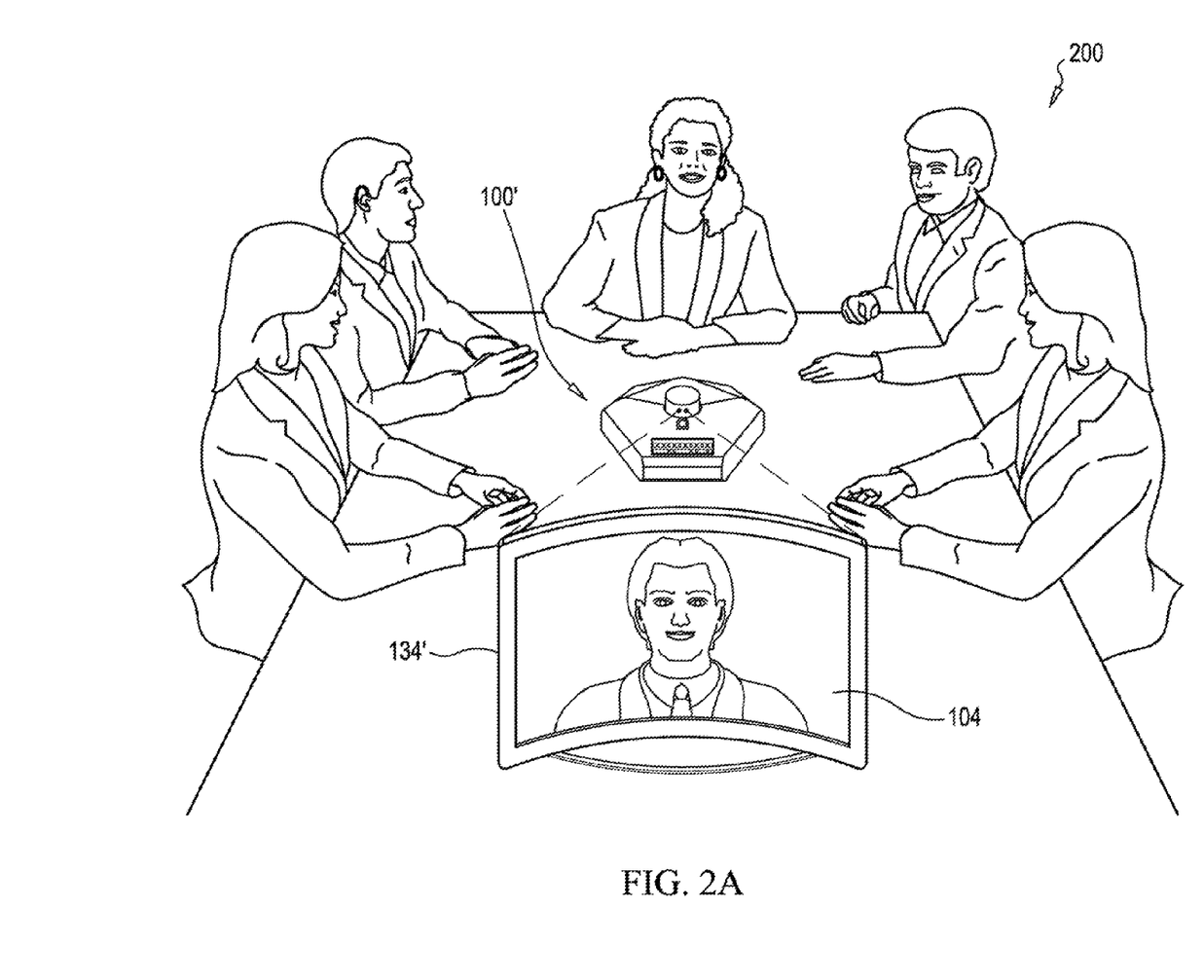
FIGS. 2A & 2B shows an exemplary system according to additional aspects of embodiments of the present invention.
Figure 2B:
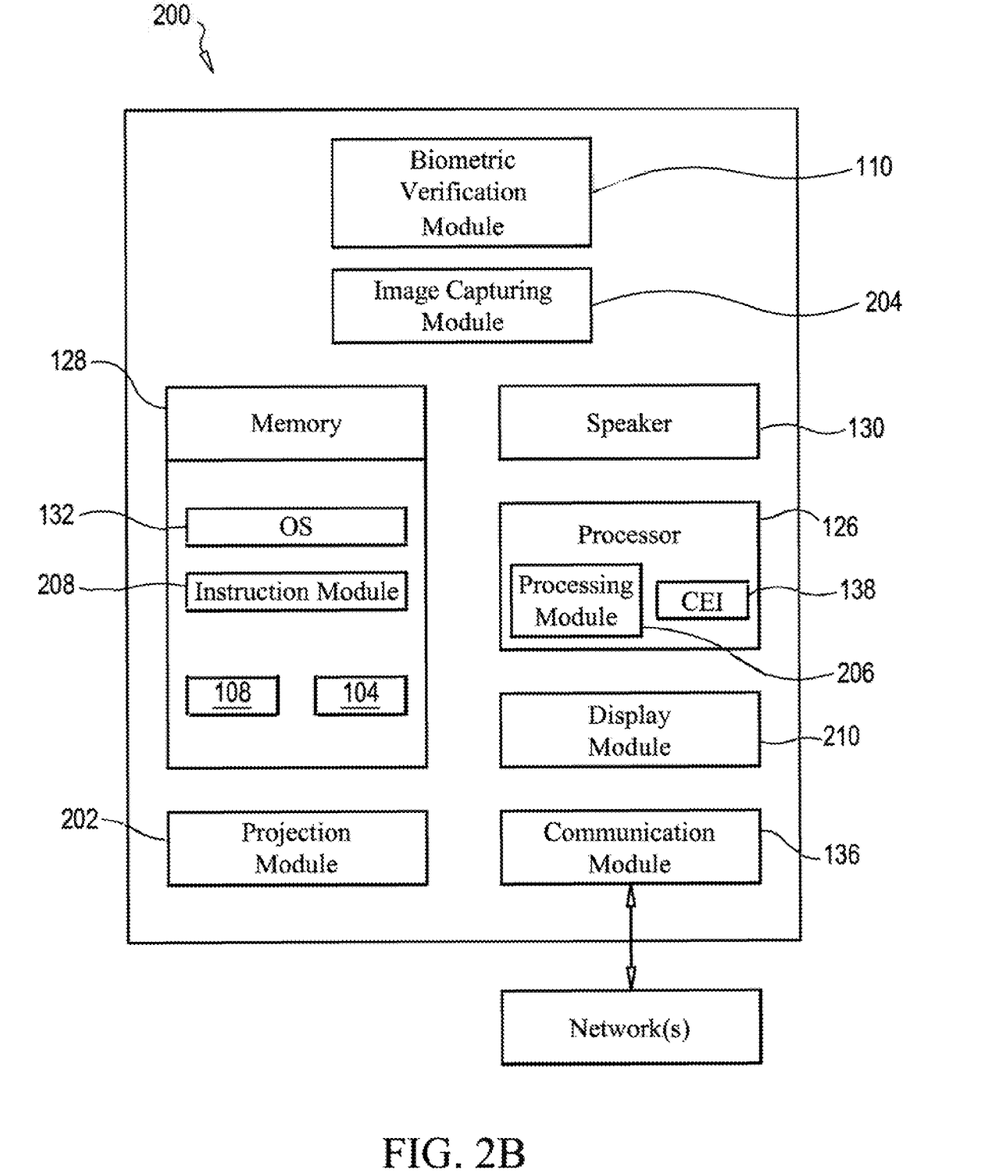

FIGS. 2A & 2B are exemplary embodiments of the system 200 according to one embodiment of the invention. System 200 comprises a projector module 202 disposed within a holographic generating conferencing apparatus 100, enabled for projecting a hologram or holographic images 104; an image capturing module 204 enabled for capturing at least one image 108; a biometric verification module 110, disposed within the apparatus 100, enabled for validating a biometric sample, and upon validation, activating a first release and retract mechanism 112, enabled for retracting a keypad door 114, wherein the keypad door 114 is configured for concealing or revealing a keypad 118, activating a second release and retract mechanism 120 enabled for retracting the camera door 122, releasing the at least one projector 102, the camera 106 enabled for capturing the at least one image 108, and activating at least one or more camera sensors 124, 124', 124", 124''' activated for projecting the hologram video image 104; and a processor 126 that includes a processing module 206 disposed within the apparatus 100, wherein the processor 126 is in communication with memory 128, wherein the memory 128 is also disposed within the apparatus 100 and wherein the processor 126 is configured to process the at least one captured image 108 or the hologram or holographic images 104.

The term "module," as used throughout this disclosure, may refer to a unit of distinct functionality that may be presented in software, hardware, and/or combinations thereof. When the functionality of a module is performed in any part through software, the module includes a machine readable medium. In one embodiment of the invention, these computer modules may be self-contained computer hardware resident on the processor 126, or resident in memory 128. In another embodiment of the invention, they may be computer hardware resident on a designated computer chip, chip component, separate computer chips, separate components, and/or any combination thereof. Computer processor 126 may be programmed to control the various system elements and/or modules for the various system functions being performed.

In some embodiments of the invention, processor 126 may include a computer processing module 206, and an instruction module 208 that may be stored in memory 128, wherein the processing module 206 may be configured to perform others tasks not undertaken by the other modules. Processor 126 may be any type of processor, such as, but not limited to, a central processing unit (CPU), a microprocessor, a video processor, a front end processor, a coprocessor, a single-core central processor, a multi-core processor, or a combination thereof and the like. In yet another embodiment of the invention, the instruction module 208, a display module 210, communication module 136, and/or the various modules disclosed herein may all be in electronic communication with computer processing module 206 that comprises of computer executable instructions 138. Processing module 206 may be configured to generate at least one or more holograms 104 corresponding to a desired holographic image 104 to be displayed. Holograms and/or holographic images 104 may be projected by way of one or more of projector module 202.

In some embodiments projector module 202 comprises of hardware components, e.g. the at least one or more projectors 102 as previously described herein, and is disposed within the apparatus 100. In yet another embodiment, projector module 202 comprises of hardware and software components, for example including computer executable code that is controlled by the processing module 202, wherein the projector module 202 may be configured to project hologram(s) and/or holographic video image(s). Projector module 202 may, in one aspect of an embodiment of the present invention, also be configured to execute the functions of the image capturing module 204 and/or camera optical relay.

In one aspect of an embodiment of the present invention, system 200 may be enabled by 3-D holographic imaging technology thereby enabling projector module 202 to project a 3-D image in real time. Projector module 202 may, in another aspect of an embodiment of the present invention, include 3D depth sensors 124, which are enabled for projecting the holographic video image 104 and for detecting hand interactivity with hologram(s) or holographic video image(s) 104. In one aspect of an embodiment of the present invention, system 100 may use depth-sensing technology to detect a user's hands in real-world space. System 200 may include an operating system 132 that may, in one aspect of an embodiment of the present invention, use gesture recognition software to process hand states and position. Interactive logic may also be applied to the processed data and the 3-D scene or image responds accordingly.

Projector module 202 may also, in another aspect, include visual trackers, which, in one aspect may include one or more lasers, which may be used to accurately track the hands of a user and the interaction with hologram(s) or holographic video image(s) 104. These aspects of projector module 202 enable a user to control holograms(s) or holographic video image(s) 104 and the content projected within hologram(s) or holographic video image(s) 104.

In one aspect of an embodiment of the present invention, the 3-D image projected by projector module 202 may be viewed by way of 3-D glasses. In another aspect, the hologram generator conferencing apparatus 100 of the system 200 may be configured to teed real time content and may be compatible with secondary enabled devices, including, without limitation, a second hologram generator conferencing apparatus 100', a secondary display 134' screen, mobile phones, active and/or passive 3-D glasses, etc. These enabled devices may be able to communicate with hologram generator conferencing apparatus 100 in a number of ways, including, without limitation, hardwire connection and/or wireless connection. For wider compatibility, hologram generator conferencing apparatus 100 may include USB/serial port(s) 142 and Wi-Fi radio to this end. Compatible enabled devices may also have standard communication protocol libraries. In another aspect of an embodiment of the present invention, hologram generator conferencing apparatus 100 may be controlled by way of one or more of the enabled devices.

Hologram(s) or holographic video image(s) 108 may be seen with smart mobile and optical devices, which have the capability to render 3-D objects in real-time over a live camera feed. System's hologram generator conferencing apparatus 100 may, in yet another aspect of an embodiment of the present invention, be enabled to project content communicated through one or more enabled devices.

In aspects of embodiments of the present invention, system 200 may be enabled for the transformation of hologram(s) or holographic video image(s) 104 and/or the content of hologram(s) or holographic video image(s) 104 and the real time manifestation of hologram(s) or holographic video image(s) 104 in conjunction with projector module 202 and projector module 202's optical projection of hologram(s) or holographic video image(s) 104.

Hologram generator conferencing apparatus 100, in one aspect of an embodiment of the present invention, may provide for the hosting and display of already made hologram images or videos 104 and a second apparatus 100' for receiving the captured image 108, converting the captured image 108 into a hologram or holographic video image(s) and displaying the same in real time thereby enabling a live video conferencing of remote parties where each remote party can view, and hear the other remote party as the video is displayed as a hologram by the receiving second hologram generating conference apparatus 102' on a secondary display 134' screen or in the air.

In some embodiments image capturing module 204 comprises of hardware components, e.g. may include any type of camera 106, an infrared camera, a thermal imaging camera, a video sensor, a digital camera, a 3D camera, and the like as previously described herein, and is disposed within the apparatus 100. In yet another embodiment, image capturing module 204 comprises of both hardware and software components, for example including computer executable code that is controlled by the processing module 202, wherein upon proper authentication of a an authorized user, the processing module 206 issues a command to the $2^{nd}$ release and retract mechanism 120 enabling the camera door 122 to be opened, enabling the image capturing module 204 for automatically capture an image 108 that is processed by the processing module 206 and enabling the various camera sensors 124, 124', 124", 124''' for projecting the holographic video images 108 as needed. Image capturing module 204 may include a flash component, which may be used to illuminate the subjects in the image 108.

Biometric verification module 110 may include hardware and/or software components, e.g. at least one processor 104 and/or processing module 206 disposed in communication with, for example, a fingerprint scanner, hand geometry scanner, a palm geometry scanner, iris scanner, retina scanner, or a user interface, which may include an audio receiving circuit capable of receiving audio signals at predetermined frequencies and/or with additional hardware complete with electronic circuitry and such other biometric verification devices that are known and used in the arts. In the exemplary embodiment, biometric verification module 110 includes a fingerprint scanner, where the processing module 206 controls the functionality of the fingerprint scanner, generating the varied algorithms for storage of the first valid biometric sample as a biometric identifier and validates the images of subsequent biometric samples received from the apparatus 100.

In some embodiments, to start a holographic video conference (either receiving or making a teleconference call), user may submit, e.g. his/her biometric authentication credential, e.g. a fingerprint, which will be authenticated against a stored biometric identifier. Processing module 206, upon receipt of the electronic data from the biometric sample as received from the biometric verification module 110, records the data and compares the received data with a previously stored biometric algorithm stored in memory 128. Upon authentication of the biometric sample as authenticated by the biometric verification module 110 with a successful or positive match between the received data and the previously stored user verification biometric algorithm for an authorized user, processing module 206 issues a command to the first release and retract mechanism 112 for keypad door 114 to open; and to the second release and retract mechanism 120 for the camera door 116 to open, retracting both doors 114, 116 into the apparatus' housing 110.

System further comprises of a display module 210 that may be electronically connected to the processing module 206 according to the hardware and software protocols that are well known and used in the arts. Display module 210 as controlled by the processor 126 may include any kind of display 134, such as, but not limited to: LCD screen, LED display, touchpad or touch screen display, and/or any other means known in the arts for emitting a visually perceptible output. Display module 210 may include a control means, such as, but not limited to, a touch screen, keyboard, virtual keys, a stylus, and other input devices and the like.

System also comprises of the communication module 136 that is either electrically or mechanically connected to processor 126 and/or processor module 208, which controls the operations of the communications module 132. Processor module 208 is also in electrical or mechanical communication with the image capturing module 204, recognizes when an image 108 and audio is captured and issues a command to the communication module 136, which is enabled for transmitting the at least one captured image 108 to a second apparatus 100', to transmit the at least one captured image 108 to the second apparatus 100'. Each apparatus' communication module 136 is enabled for receiving the at least one captured image 108, for which the processor module 208 converts the received captured at least one image 108 and issues a command to its projector module 202 to display the converted image 108 as a hologram and/or holographic images 104.

In some embodiments, communication module 136 may be a wireless communication module 136, which employ short range wireless protocol, such as, but not limited to, a radio frequency transceiver, a radio frequency receiver, and/or a radio frequency transmitter. The communication module 136 may include any type of communications means, including, but not limited to, a wireless communications means or wired communications means, such as a GSM modem, a WiFi module, a Bluetooth module, a ZigBee module, and any other type of communications means used to communicate directly with another apparatus 100, or indirectly with another secondary device, such as a cellular phone, personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network.

In yet another embodiment, communication module 136 comprises a communications means for accessing a cellular network, such as a GSM network, a data network, such as a local data network, or a wide area data network, such as the Internet. In yet another embodiment, at least one communication module 136 comprises communications means for accessing a web-enabled device, such as a Bluetooth module for accessing a web-enabled smartphone or a second apparatus 100'.

Communication module 136 is operative to transmit or receive electronic communications (data), e.g. the captured image 108, via a short range wireless protocol, such as, but not limited to, a radio frequency receiver, a radio frequency transmitter, or a radio frequency transceiver. Communication module 136 is enabled for issuing notification of incoming calls with a ring signal to the system 200, whereby upon receiving the call, similar to making the call, user is required to first authenticate his/her authority via the biometric verification module 110, e.g. provide fingerprint for authentication, to start the system. Communication module 136 is also enabled for providing notification via the display module 210 of incoming/outgoing calls; transmit data while the teleconference session is active; issue a busy signal to incoming calls while teleconference mode is operational, cease and/or pause transmission of the captured image when the teleconferencing session is terminated/inactive.

System 200 may include one or more projector module 202 disposed within the hologram conferencing apparatus 100 that is configured to capture at least one image that is transmitted to a second hologram generator conferencing apparatus 100 that receives the captured image, converts the captured image and displays the converted captured image as a hologram video image 104. Projector module 202 may, in one aspect of an embodiment of the present invention, also be configured to function as a camera and/or camera optical relay. Hologram generator conferencing apparatus 100 may also be configured to project the hologram(s) on a screen that is constructed of materials that are known and used in the art for electronic screen displays.

System 200 may further include an operating system 132, which may further include a processor 126 and memory 128 and, in another aspect, additional modules or components as necessary. In one aspect of an embodiment of the present invention, processor 126 may, in one aspect of an embodiment of the present invention, be disposed in communication with memory 128.

In one aspect of an embodiment of the present invention, embedded within processor 126 are computer executable instructions or code 138, which are readable and executable by processor 126. In another aspect, these computer executable instructions 138 may be stored in memory 128. Computer executable instructions 138 may be in the form of a computer program, the program being composed in any suitable programming language or source code, such as C++, C, JAVA, JavaScript, HTML, XML, and other programming languages. Computer executable instructions 138 may be configured for performing any and all the necessary system functions and operations disclosed herein.

System 200 also comprises of memory 128 that is either electrically or mechanically connected to the computer processor 126. In the case of electronic connections, the electronic connections may be wired and/or wireless connections. Memory 128 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory 128 may be used to store content, including but not limited to instruction module 204, operating system 156, at least one captured image 108 and audio, user authentication information, and the like. Information stored thereon may be retrieved from memory 128 using the computer processor 126.

Processor 126 may also be programmed to receive or prompt the user with instructions, which may be displayed on the display 142. In some embodiments, device 102 also includes a speaker 144 as are well known and used in the arts for broadcasting the various functions being performed, e.g. for the vision impaired.

As shown in FIG. 2A, a stored or real time holographic video image 104 may be hosted by operating system 132 and the image size may be determined by the required level of distribution that is associated with the image size. The level of distribution size is normally chosen automatically by operating system 132 so as to ensure that the information contained in hologram(s) or holographic video image(s) 104 is evenly spread across the dimensions of the hologram display. Hologram(s) or holographic video image(s) 104 may be computed from the defined setting according operating system's 132 capabilities.

In one aspect of an embodiment of the present invention, operating system 132 may be optimized for 3-Dimensional and/or augmented reality technology and displays. In another aspect of an embodiment of the present invention, operating system 132 may be based on one or more open source platform(s). Operating system 132 must, in another aspect, have the minimal capability of running multiple instances of server platform(s) (e.g. Node.js) that may be used for real time communication between hologram generator device 100 and other devices. Operating system 132, in one aspect of an embodiment of the present invention, must be enabled to run multiple instances of these server platform(s) and managing the depth software associated with projector(s) 104 simultaneously. In yet another aspect of an embodiment of the present invention, elements of hologram conferencing generator device 100 may be controlled, operated by, and/or disposed in communication with operating system 132.

The set of final holograms may be outputted from operating system 132 which then transfers it onto the video imagery display for final display. Accordingly, the present invention may also relate to a real time display of a recorded or real time video, text, object image by means of holographic formations. Various means are proposed for the transformation of the hologram content, the real time manifestation of the holograms through projector(s) or device camera 106 and the optical projection of hologram(s) 104. Hologram generator device 100 may be enabled to facilitate real time, portable, easy access for low and high tech users of hologram(s).

It will be understood that it is possible to provide more than hologram touch frame for video image 104 and to operate on each frame of hologram(s) in the manner described with reference to FIGS. 1A-2B, to provide final hologram(s) for projection of desired video image 104 at an image plane.

In one aspect of an embodiment of the present invention, as hologram(s) or holographic video image(s) 104 is being projected, additional hologram(s), objects and/or videos (data) may arrive at operating system 132, which then will process the data by pausing the new arrivals or incoming data while enabling the current projected content for the hologram(s) or holographic video image(s) 104 being displayed to be completed. Operating system 132 may, in one aspect of an embodiment of the present invention, send a signal out to the frame of the newly arrived hologram by alerting the user of its arrival by blinking with a setting color that the user may've already preset, indicating there is a message, video, image: or new hologram and the like, waiting to be viewed. In another aspect, hologram generator device 100 may have sizeable memory within the device that can enable storage while an image or object is being displayed.

Methods

Figure 3:
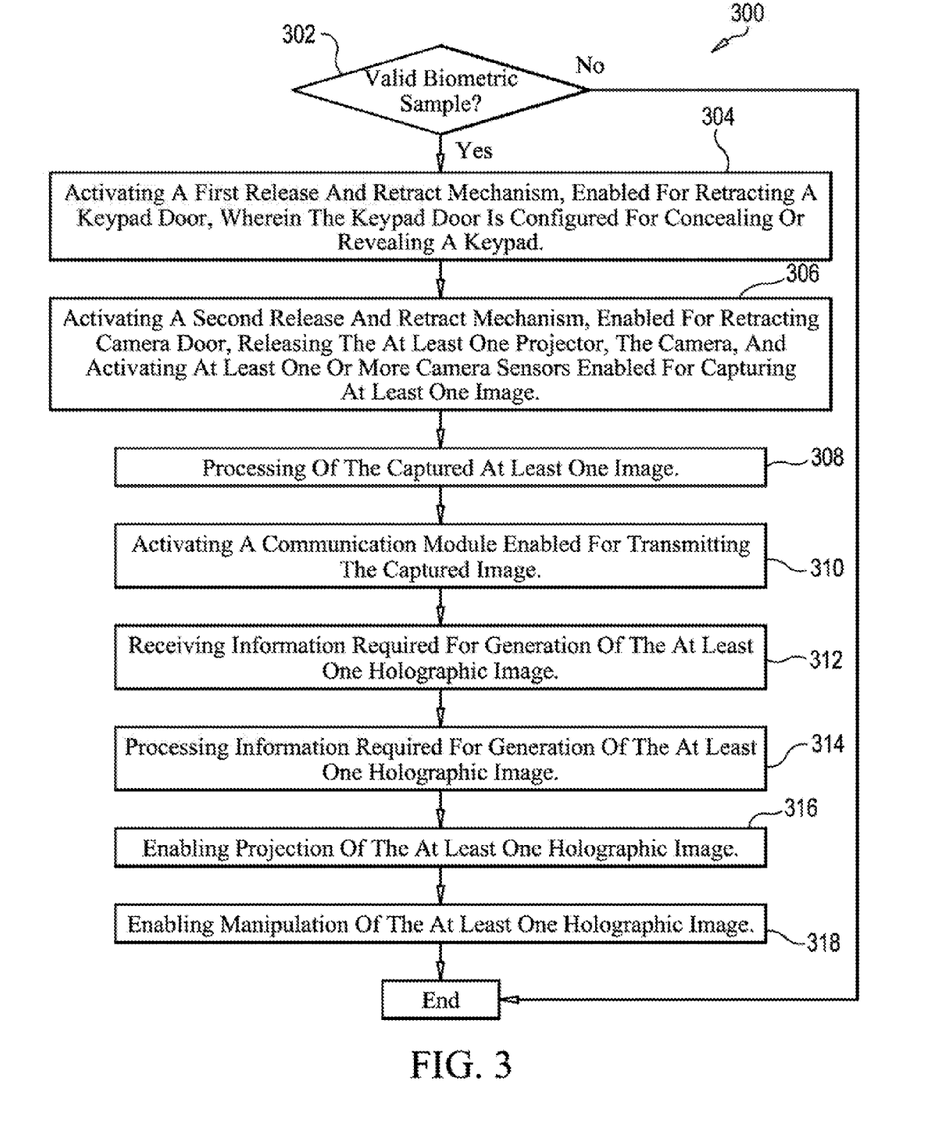
FIG. 3 shows a process flow chart according to an aspect of an embodiment of the present invention.

Referring now to FIG. 3, a process or flow or method 300 according to an aspect of an embodiment of the present invention is shown. Process 300 begins with hologram generator device 100 authenticating a biometric sample as received via the biometric verification module 110 (step 302). If the biometric sample is unable to be authenticated, the apparatus 100 and system 200 will be unavailable for use. Process 300 further comprises activating a first release and retract mechanism 112, enabled for retracting a keypad door 114, wherein the keypad door 114 is configured for concealing or revealing a keypad 118 (step 304); activating a second release and retract mechanism 120 enabled for retracting camera door 122, releasing the at least one projector 102, the camera 106 enabled for capturing at least one image 108, and activating at least one or more 3D Depth camera sensors 124, 124', 124'', 124''' for projecting the holographic video images 108 (step 306) that will be displayed (projected) as holographic video image(s), video and/or multimedia data on either a receiving second hologram generator conference apparatus 100' or a secondary device. The captured at least one image 108 is processed by the processor (step 308), which activate the communications module enabled for transmitting the captured image 108 to transmit the captured image to the second apparatus or secondary device (step 310).

The receiving second hologram generator conference apparatus 100' receives (step 312) and process data or information necessary for the display of the hologram image(s) (step 314) after processor enables projection of the hologram(s) or holographic video image(s) 104 (step 316), which may or may not be in real-time and enabling manipulation of the hologram(s) or holographic video image(s) 104 (step 318). In one aspect, a 3-D hologram(s) or holographic video image(s) 104 may be projected.

The hologram image 108 may then be controlled from an air display. In one aspect, this control may be from only air display, wherein the user may explore and manipulate projected image or hologram(s) or holographic video image(s) 104 as projected on air display. In one aspect, the user may be able to manipulate content within the hologram(s) or holographic video image(s) 104. In another aspect, the sensed hand interactions with the hologram(s) or holographic video image(s) 104 may be coordinated to have the effects reflected in the hologram(s) or holographic video image(s) 104. This may be made possible by the tracking of the user's hand motions by visual tracker(s) of projector(s) 102.

The color and background of projected image(s) or hologram(s) 104 projected on air display may be maintained or changed based on material that is closer to the display environment. Content being displayed may have the ability of being tinted with a color. That tint color can be determined based on the color(s) of other materials within a close proximity to hologram generating conferring apparatus 100.

In one aspect of an embodiment of the present invention, process 300 may further include the steps of matching operating system's 132 setting operations to generate at least one or more holograms associated with the hosted operating system 132 to prepare the final holograms for display. This may include the step of generating videos from a plurality of frames where each frame is comprised of resultant holographic images. Process 400 may also include the step of displaying at least one or more holograms for each frame of the video.

Hardware and Operating Environment

This section provides an overview of example hardware and the operating environments in conjunction with which embodiments of the inventive subject matter may be implemented.

Figure 4:
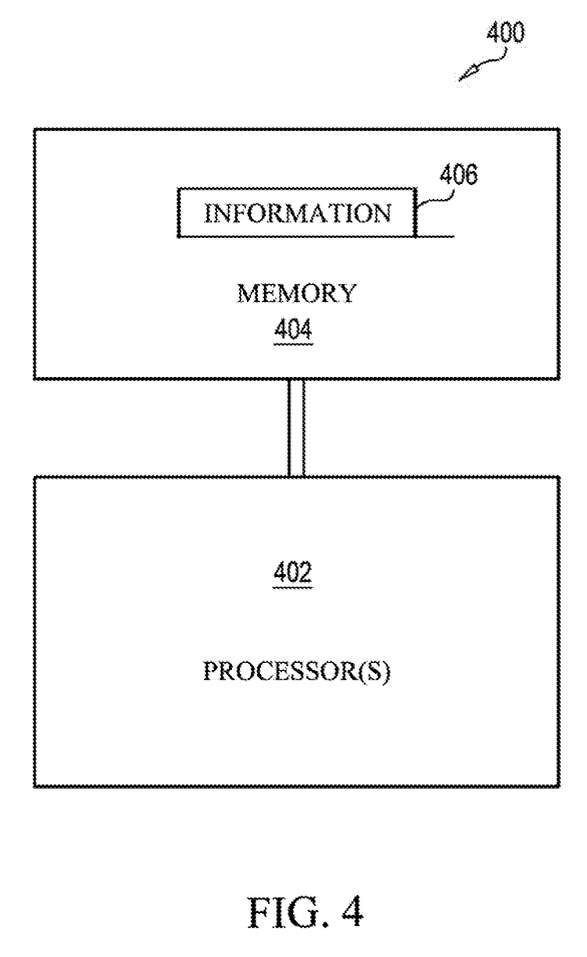
FIG. 4 shows a block diagram according to an aspect of an embodiment of the present invention.

Referring now to FIG. 4, a block diagram according to an aspect of an embodiment of the present invention is shown. In one aspect of an embodiment of the present invention, a software program may be launched from a computer readable medium in a computer-based system 500 to execute the functions defined in the software program. Various programming languages may be employed to create software programs designed to implement and perform the operations disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Apparatus 400, as shown in FIG. 4 may include, in one aspect of an embodiment of the present invention, a computer, a memory system, a magnetic or optical disk, some other storage device, or any type of electronic device or system. Apparatus 400 may include one or more processor(s) 402 disposed in communication with a machine-accessible medium such as memory 404 (e.g., a memory including electrical, optical, or electromagnetic elements). Memory 404 may contain associated information 406 (e.g., computer program instruction code, data, or both) which, when accessed, results in a machine (e.g., the processor(s) 404) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus for generating holograms comprising:
   at least one projector disposed within the apparatus, enabled for projecting a hologram or holographic images;
   a camera enabled for capturing at least one image;
   a biometric verification device, disposed within the apparatus, enabled for validating a biometric sample, and upon validation, activating a first release and retract mechanism, enabled for retracting a keypad door, wherein the keypad door is configured for concealing or revealing a keypad, activating a second release and retract mechanism enabled for retracting camera door, releasing the at least one projector, the camera, and activating at least one or more camera sensors enabled for projecting the hologram video image; and
   a processor disposed within the apparatus, wherein the processor is in communication with memory, wherein the memory is also disposed within the apparatus and wherein the processor is configured to process the at least one captured image or the at least one holographic image.

2. The apparatus according to claim 1, further comprising a communication module enabled for transmitting the captured at least one image to a second apparatus and/or a secondary device.

3. The apparatus according to claim 2, further comprising the communication module enabled for receiving the captured at least one image.

4. The apparatus according to claim 3, wherein the processor is configured for converting the received captured at least one image into a hologram(s) and/or holographic video image(s).

5. The apparatus according to claim 4, wherein the processor is configured for activating the apparatus' projector to project the holographic image.

6. The apparatus according to claim 2, wherein the secondary device is enabled for displaying the hologram(s) and/or holographic video image(s).

7. The apparatus according to claim 1, wherein the hologram is displayed on a screen or in the air.

8. A system comprising:
   at least one projector disposed within a holographic generator conferencing apparatus, enabled for projecting a hologram or holographic images;
   a camera enabled for capturing at least one image;
   a biometric verification module, disposed within the apparatus, enabled for validating a biometric sample, and upon validation, activating a first release and retract mechanism, enabled for retracting a keypad door, wherein the keypad door is configured for concealing or revealing a keypad, activating a second release and retract mechanism enabled for retracting camera door, releasing the at least one projector, the camera, and activating at least one or more camera sensors enabled for projecting the hologram video image; and
   a processor disposed within the apparatus, wherein the processor is in communication with memory, wherein the memory is also disposed within the apparatus and wherein the processor is configured to process the at least one captured image or the at least one holographic image.

9. The system according to claim 8, further comprising a communication module enabled for transmitting the captured at least one image to a second apparatus and/or a secondary device.

10. The system according to claim 9, wherein the communication module is enabled for receiving the captured at least one image.

11. The system according to claim 10, wherein the processor is configured for converting the received captured at least one image into a hologram(s) and/or holographic video image(s).

12. The system according to claim 9, wherein the processor is configured for activating the apparatus' projector to project the holographic image.

13. The system according to claim 9, wherein the secondary device is enabled for displaying the hologram(s) and/or holographic video image(s).

14. The system according to claim 8, wherein the hologram is displayed on a screen or in the air.

15. The system according to claim 8, further comprising at least one depth sensor disposed within the apparatus and in communication with the processor, wherein the at least one depth sensor is configured to detect a user's hands and gestures.

16. A method comprising:
   authenticating a biometric sample as received via a biometric verification module;
   activating a first release and retract mechanism, enabled for retracting a keypad door, wherein the keypad door is configured for concealing or revealing a keypad;
   activating a second release and retract mechanism enabled for retracting camera door, releasing at least one projector, the camera enabled for capturing the at least one image, and activating at least one or more camera sensors enabled for projecting holographic video images;
   processing the captured at least one image;
   activating a communication module enabled for transmitting the captured image;
   receiving information required for generation of the at least one holographic image;
   processing information required for generation of the at least one holographic image;
   enabling projection of the at least one holographic image; and
   enabling manipulation of the at least one holographic image.

17. The method of claim 16, further comprising the step of controlling the at least one holographic image from an air display.

18. The method of claim 16, further comprising the step of enabling manipulation of content within the at least one holographic image.

19. The method of claim 16, further comprising the step of enabling real-time projection of the at least one holographic image.

20. The method of claim 16, further comprising the step of displaying a 3-dimensional holographic image on either a second hologram generator apparatus or a display device.

21. The method of claim 16, further comprising the step of transmitting the captured at least one image to a second apparatus and/or a secondary device.

22. The method of claim 21, further comprising the step of receiving the captured at least one image.

23. The method of claim 22, further comprising the step of converting the received captured at least one image into a hologram(s) and/or holographic video image(s).

24. The method of claim 22, further comprising the step of activating the apparatus' projector to project the holographic image.

25. The method of claim 22, further comprising the step of enabling the secondary device for displaying the hologram(s) and/or holographic video image(s).

26. A computer program product comprising a computer readable medium having control logic stored therein for causing a processor to enable the display of at least one holographic image, the control logic comprising:
   computer readable code for authenticating a biometric sample as received via a biometric verification module;
   computer readable code for activating a first release and retract mechanism, enabled for retracting a keypad door, wherein the keypad door is configured for concealing or revealing a keypad;
   computer readable code for activating a second release and retract mechanism enabled for retracting camera door, releasing at least one projector, the camera enabled for capturing the at least one image, and activating at least one or more camera sensors enabled for projecting the holographic video images;
   computer readable code for processing the captured at least one image;
   computer readable code for activating a communication module enabled for transmitting the captured image;
   computer readable code for receiving information required for generation of the at least one holographic image;
   computer readable code for processing information required for generation of the at least one holographic image;
   computer readable code for enabling projection of the at least one holographic image; and
   computer readable code for enabling manipulation of the at least one holographic image.

27. The computer program product of claim 26, further comprising computer readable code for enabling manipulation of content within the at least one holographic image.

28. The computer program product of claim 26, further comprising computer readable code for enabling control of the at least one holographic image from an air display.

29. The computer program product of claim 26, further comprising computer readable code for enabling real-time projection of the at least one holographic image.

30. The computer program product of claim 26, further comprising computer readable code for displaying a 3-dimensional holographic image.

* * * * *